(12) United States Patent
Wan et al.

(10) Patent No.: US 12,120,090 B2
(45) Date of Patent: Oct. 15, 2024

(54) RESIDENTIAL GATEWAY IP PREFIX RENEWAL AFTER RE-REGISTRATION

(71) Applicant: Nokia Solutions and Networks Oy, Espoo (FI)

(72) Inventors: Kenneth Wan, Ottawa (CA); Killian De Smedt, Antwerp (BE)

(73) Assignee: Nokia Solutions & Networks Oy, Espoo (FI)

( * ) Notice: Subject to any disclaimer, the term of this patent is extended or adjusted under 35 U.S.C. 154(b) by 0 days.

(21) Appl. No.: 18/055,971

(22) Filed: Nov. 16, 2022

(65) Prior Publication Data
US 2024/0163248 A1    May 16, 2024

(51) Int. Cl.
| | |
|---|---|
| *H04W 60/00* | (2009.01) |
| *H04L 61/5007* | (2022.01) |
| *H04L 61/5046* | (2022.01) |
| *H04L 61/5053* | (2022.01) |
| *H04W 88/16* | (2009.01) |

(52) U.S. Cl.
CPC ...... *H04L 61/5053* (2022.05); *H04L 61/5007* (2022.05); *H04L 61/5046* (2022.05)

(58) Field of Classification Search
None
See application file for complete search history.

(56) References Cited

U.S. PATENT DOCUMENTS

| | | | | |
|---|---|---|---|---|
| 2010/0189052 | A1* | 7/2010 | Kavanagh | H04W 12/069 370/329 |
| 2011/0110375 | A1* | 5/2011 | Boucadair | H04L 61/251 370/393 |
| 2012/0011274 | A1* | 1/2012 | Moreman | H04L 61/2528 709/238 |
| 2012/0182994 | A1* | 7/2012 | Dec | H04L 69/40 370/392 |
| 2012/0278457 | A1* | 11/2012 | Yasrebi | H04L 65/1036 709/221 |

(Continued)

FOREIGN PATENT DOCUMENTS

WO    WO-2020/072652 A1    4/2020

OTHER PUBLICATIONS

3rd Generation Partnership Project; Technical Specification Group Services and System Aspects; Wireless and wireline convergence access support for the 5G System (5GS), 3GPP TS 23.316, vol. 17.2.0, Dec. 2021.

(Continued)

*Primary Examiner* — Christopher B Robinson
(74) *Attorney, Agent, or Firm* — Harness, Dickey & Pierce, P.L.C.

(57) ABSTRACT

A residential gateway to facilitate network access to a network, comprises at least one processor and at least one memory. The at least one memory stores instructions that, when executed by the at least one processor, cause the residential gateway to: communicate packet data for IP services being provided to an end user device and the network, the end user device having been assigned an IP address based on a first IP prefix assigned to the residential (Continued)

gateway; receive a second IP prefix assigned to the residential gateway; and notify the end user device that the IP address assigned to the end user device is no longer valid based on receipt of the second IP prefix.

20 Claims, 3 Drawing Sheets

(56) References Cited

U.S. PATENT DOCUMENTS

| | | | |
|---|---|---|---|
| 2013/0254423 A1* | 9/2013 | George, IV | H04L 61/4511 709/238 |
| 2014/0044131 A1* | 2/2014 | Wen | H04L 69/16 370/392 |
| 2015/0089594 A1* | 3/2015 | Subramanian | H04L 63/08 726/4 |
| 2015/0244630 A1* | 8/2015 | Madem | H04L 12/66 370/252 |
| 2018/0041440 A1* | 2/2018 | Goemaere | H04L 12/2854 |
| 2020/0382466 A1* | 12/2020 | Ly | H04L 41/12 |
| 2022/0060350 A1* | 2/2022 | Dimitrovski | H04W 76/12 |

OTHER PUBLICATIONS

Singh W Beebee Cisco Systems H et al: Basic Requirements for IPV6 Customer Edge Routers; RFC7084.TXT, Internet Engineering Task Force, IETF; Standard, Internet Society (ISOC) 4, Rue Des Falaises CH-1205 Geneva, Switzerland, Nov. 22, 2013 (Nov. 22, 2013), pp. 1-21, XP015094909.

Luyuan Fang Deepak Bansal Microsoft Fabio Chiussi: Forcerenew Reconfiguration Extensions for DHCPV4; Draft-Fang-DHC-DHCPV4-Forcerenew-Extensions-02.TXT, Internet Engineering Task Force, IETF; Standardworkingdraft, Internet Society (ISOC) 4, Rue Des Falaises CH-1205 Geneva, Switzerland, Mar. 22, 2016 (Mar. 22, 2016), pp. 1-7, XP015112267.

T' Joens C Hublet Alcatel P De Schrijver Mind Y: DHCP Reconfigure Extension; RFC3203.TXT, Internet Engineering Task Force, IETF; Standard, Internet Society (ISOC) 4, Rue Des Falaises CH-1205 Geneva, Switzerland, Dec. 1, 2001 (Dec. 1, 2001), XP015008982.

Extended European Search Report Corresponding to European Patent Application No. 23199971.5, mailed Feb. 22, 2024.

* cited by examiner

RESIDENTIAL GATEWAY IP PREFIX RENEWAL AFTER RE-REGISTRATION

TECHNICAL FIELD

One or more example embodiments relate to methods, apparatuses, and/or non-transitory computer-readable storage mediums for providing network access to residential gateways.

BACKGROUND

Third Generation Partnership Project (3GPP) 5th generation (5G) technology is a next generation of radio systems and network architecture that can deliver extreme broadband and ultra-robust, low latency connectivity. 5G technology improves a variety of telecommunication services offered to end users and helps support massive broadband that delivers gigabytes of bandwidth per second on demand for both uplink and downlink transmissions.

In general, a 5G network may support IP services, such as IP television (IPTV) services for a residential gateway (RG), such as a 5G-RG or a Fixed Network-RG (FN-RG) served by a 5G Core (5GC).

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

At least one example embodiment provides a method for facilitating network access to a network, via a residential gateway, the method comprising: communicating, by the residential gateway, packet data for IP services being provided to an end user device and the network, the end user device having been assigned an IP address based on a first IP prefix assigned to the residential gateway; receiving, at the residential gateway, a second IP prefix assigned to the residential gateway; and notifying, by the residential gateway, the end user device that the IP address assigned to the end user device is no longer valid based on receipt of the second IP prefix.

At least one other example embodiment provides a non-transitory computer-readable storage medium storing computer executable instructions that, when executed by at least one processor at a residential gateway, cause the residential gateway to perform a method for facilitating network access to a network, via a residential gateway, the method comprising: communicating, by the residential gateway, packet data for IP services being provided to an end user device and the network, the end user device having been assigned an IP address based on a first IP prefix assigned to the residential gateway; receiving, at the residential gateway, a second IP prefix assigned to the residential gateway; and notifying, by the residential gateway, the end user device that the IP address assigned to the end user device is no longer valid based on receipt of the second IP prefix.

The second IP prefix may replace the first IP prefix at the residential gateway.

The notifying may include informing the end user device that the IP address must be renewed for continued access to the IP services via the residential gateway.

The method may further include renewing the IP address by assigning an IP address from the second IP prefix to the end user device without hard reboot of the residential gateway.

The informing may include at least one of: performing a portal HTTP redirect to inform the end user device that the IP address must be renewed; disabling a wireless network connection between the end user device and the residential gateway; informing the end user device that an address lifetime for the IP address is 0; or push a notification to the end user device, the notification informing the end user device that the IP address must be renewed.

The informing may include disabling the wireless network connection, and the disabling the wireless network connection may include performing a shutdown of a service set identifier associated with the wireless network connection between the end user device and the residential gateway.

The residential gateway may be configured for SLAAC based IP address assignment, and the informing may include informing the end user device that the address lifetime for the IP address is 0.

The residential gateway may be a 5G residential gateway, the network may be a 5G core, and the IP address may be an IPv6 address.

At least one other example embodiment provides a residential gateway to facilitate network access to a network. The residential gateway includes at least one processor and at least one memory. The at least one memory stores instructions that, when executed by the at least one processor, cause the residential gateway to: communicate packet data for IP services being provided to an end user device and the network, the end user device having been assigned an IP address based on a first IP prefix assigned to the residential gateway; receive a second IP prefix assigned to the residential gateway; and notify the end user device that the IP address assigned to the end user device is no longer valid based on receipt of the second IP prefix.

At least one other example embodiment provides a residential gateway to facilitate network access to a network. The residential gateway comprises: means for communicating packet data for IP services being provided to an end user device and the network, the end user device having been assigned an IP address based on a first IP prefix assigned to the residential gateway; means for receiving a second IP prefix assigned to the residential gateway; and means for notifying the end user device that the IP address assigned to the end user device is no longer valid based on receipt of the second IP prefix.

The second IP prefix may replace the first IP prefix at the residential gateway.

The instructions, when executed by the at least one processor, may cause the residential gateway to notify the end user device by informing the end user device that the IP address must be renewed for continued access to the IP services via the residential gateway.

The instructions, when executed by the at least one processor, may cause the residential gateway to renew the IP address by assigning an IP address from the second IP prefix to the end user device without hard reboot of the residential gateway.

The instructions, when executed by the at least one processor, may cause the residential gateway to inform the end user device by at least one of: performing a portal HTTP redirect to inform the end user device that the IP address must be renewed; disabling a wireless network connection between the end user device and the residential gateway; informing the end user device that an address lifetime for the IP address is 0; or push a notification to the end user device, the notification informing the end user device that the IP address must be renewed.

The instructions, when executed by the at least one processor, may cause the residential gateway to inform the end user device by disabling the wireless network connection. The disabling the wireless network connection may include performing a shutdown of a service set identifier associated with the wireless network connection between the end user device and the residential gateway.

The residential gateway may be configured for SLAAC based IP address assignment, and the instructions, when executed by the at least one processor, may cause the residential gateway to inform the end user device that the IP address must be renewed by informing the end user device that the address lifetime for the IP address is 0.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of a function or network element such as a network node, residential gateway (RG), server, etc., it should be understood that one or more example embodiments discussed herein may be performed by one or more processors (or processing circuitry) at the applicable device, apparatus, RG, network node, network element, or system. For example, according to one or more example embodiments, at least one memory may store instructions that, when executed by at least one processor, cause the network element/network node, or the like, to perform the operations discussed herein.

As discussed herein, the term "mechanism," in addition to its plain and ordinary meaning, may refer to methods, apparatuses and/or non-transitory computer-readable storage mediums where applicable.

As discussed herein, the terminology "one or more" and "at least one" may be used interchangeably.

It will be appreciated that a number of example embodiments may be used in combination.

As discussed herein, the term "subscriber" refers to the purchaser or subscriber of broadband services, and which utilizes a residential gateway (RG) to access the services. The term "user" or "end user" refers to users of customer premises equipment (CPE) (also referred to as end user device(s)) that send and receive user traffic through the RG. Although used in this way for the sake of clarity, a user may also be referred to as a subscriber.

As discussed herein, a packet data unit (PDU) session refers to an IP based PDU session. An IP based PDU session (sometimes referred to as an IP session) refers to an IP connection established between a RG (e.g., a $5^{th}$ Generation-Residential Gateway (5G-RG)) and a wireless core network, such as a 5GC, where the wireless core network assigns the RG one or more IP prefix(es) to use for transmission and reception of traffic (e.g., data and control traffic). As is known, an IP prefix is an aggregation of IP addresses assigned to a device, such as a RG. The RG may assign IP addresses included in or based on the one or more IP prefix(es), to end user devices connected to the RG.

In operation, a RG utilizes the assigned IP prefix(es) to connect to the internet (or other data network). In at least some instances, a RG may obtain several different IP prefixes for each type of service, wherein each represents a different IP Session. IP based PDU sessions may include a single IPv4 session, a single IPv6 session or a single dual stack IP session. Although discussed herein with regard to IP sessions for example purposes, example embodiments should not be limited to these examples. Rather, example embodiments may be applicable to other PDU session types.

For IPv6, for example, a RG typically has IPv6 address one on the Wide Area Network (WAN) side for management and a IPv6 prefix on the Local Area Network (LAN) side. The LAN IPv6 prefix is used to assign IP addresses to end user devices such as smartphones, laptops, IoT devices, or the like.

When the 5GC needs to reassign a new IP prefix for a wireline RG, such as a wireline 5G-RG, the end user devices should be notified that their current IP address and/or IP prefix is no longer valid, and that renewal of the IP address and/or IP prefix is required. Otherwise, the end user devices may be simply stuck with their invalid IPv6 address and IPv6 services are halted until a hard reboot of the RG is performed.

One or more example embodiments provide mechanisms for network access by one or more end user devices, wherein the RG (e.g., a 5G-RG) notifies the end user devices that IP address and/or IP prefix renewal is required to maintain access to (e.g., for continued provisioning of and/or access to IP services from) the 5GC (e.g., without the need to hard reboot the RG) after the 5GC assigns a new IP address and/or prefix to the RG.

For example purposes, one or more example embodiments will be discussed herein, in some instances, with regard to IPv6 and a 5G-RG and associated system architecture. However, example embodiments should not be limited to this example.

Figure 1:
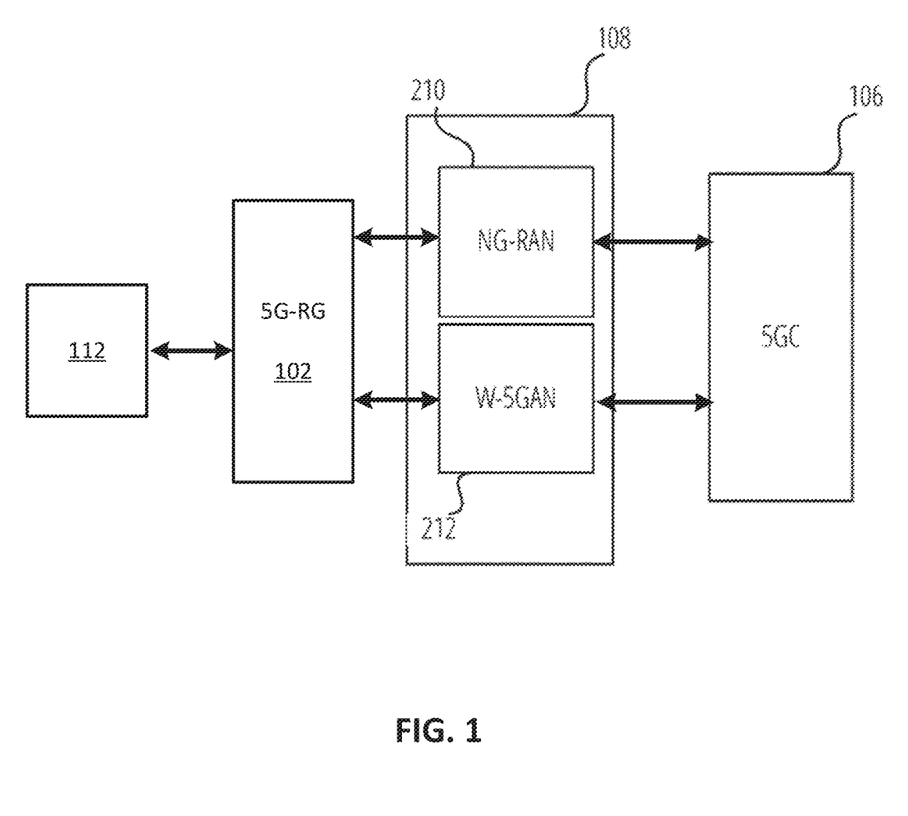
FIG. 1 is a block diagram illustrating a portion of a system architecture for wireless core network access, according to example embodiments.

FIG. 1 illustrates a portion of a system architecture according to example embodiments.

Referring to FIG. 1, an end user device (also referred to as a CPE), such as a 5GC capable end user device) 112 is communicatively connected to a 5G-RG 102. The 5G-RG 102 is in two-way communication with a 5GC 106 via an AN 108. In this example, the end user device 112 may access the 5G-RG 102 via 3GPP and/or non-3GPP access (e.g., Wireless Local Area Network (WLAN)). In one example, the 5G-RG 102 may use an N1 reference point to connect to the 5GC 106. The AN 108 may use N2 and N3 reference points to connect to the 5GC 106.

The 5G-RG 102 may be a residential gateway capable of connecting to the 5GC 106 playing the role of, for example, a user equipment (UE) with regard to the 5GC 106.

The AN 108 may include one or more of a Next Generation Radio Access Network (NG-RAN) 210 and a Wireline 5G Access Network (W-5GAN) 212. The NG-RAN 210 may connect to the 5GC 106 via N2 and N3 reference points. The W-5GAN 212 may be a wireline AN that connects to the 5GC 106 also via N2 and N3 reference points. A wireline AN may provide, for example, an optical or electrical connection. The W-5GAN 212 may also be a wireline 5G cable access network. In certain embodiments, the W-5GAN 212 may be a non-3GPP access network.

Although only a single end user device 112 is shown in FIG. 1 for the sake of brevity, it should be understood that any number of end user devices may be connected to the 5G-RG 102.

As discussed in more detail below, according to one or more example embodiments, the 5GC 106 assigns an IP prefix to the 5G-RG 102, which then assigns an IP address to the end user device 112 based on the IP prefix. Once a connection and PDU session is established with the end user device 112, the 5G-RG 102 communicates packet data for requested IP services provided to the end user device 112 by the 5GC 106.

Upon receiving, at the 5G-RG 102, a re-registration request and then a second (replacement) IP prefix assigned to the residential gateway from the 5GC 106, the 5G-RG notifies the end user device 112 that the IP address currently assigned to the end user device 112 is no longer valid.

Figure 2:
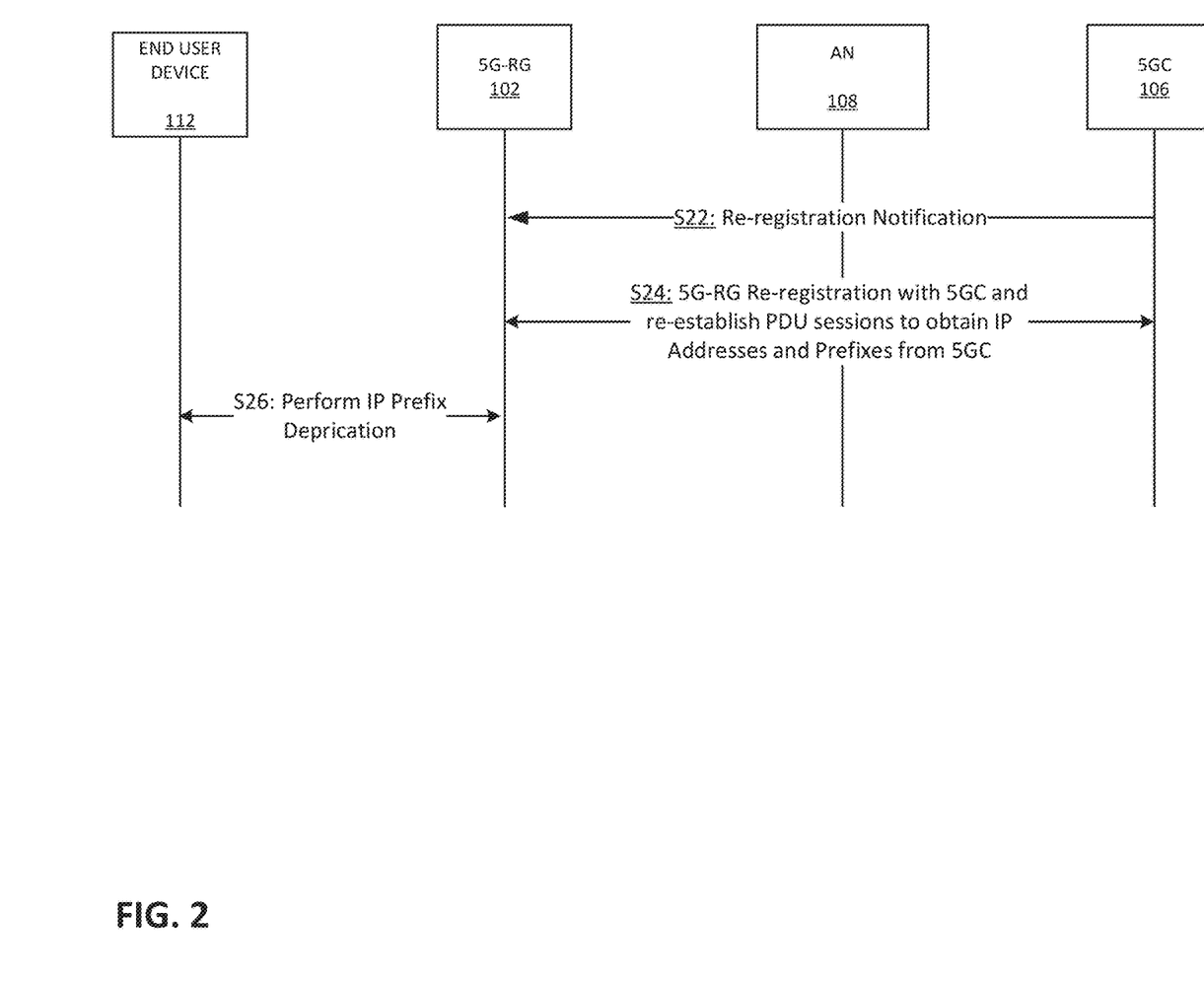
FIG. 2 is a signal flow diagram illustrating a method according to example embodiments.

FIG. 2 is a signal flow diagram illustrating a method for (e.g., restoring) network access according to example embodiments. For example purposes, the method shown in FIG. 2 will be discussed with regard to the architecture shown in FIG. 1 and, in some instances, with regard to an IP-based PDU session (referred to more simply herein as a PDU session). However, example embodiments should not be limited to this example.

Referring to FIG. 2, at S22 the 5G-RG 102 receives a re-registration notification (or request) from the 5GC 106 via the AN 108. The re-registration notification informs the 5G-RG 102 that the 5G-RG 102 must re-register with the 5GC 106. In one example, the 5GC 106 may send a re-registration notification to the 5G-RG 102 when the existing IPv6 prefix in use by the 5G-RG 102 is no longer valid. In one example, the existing IPv6 prefix for the 5G-RG 102 may become invalid in response to a change in the network slice of the 5G-RG 102 in the 5GC 106.

At S24, in response to the re-registration notification, the 5G-RG 102 re-registers with the 5GC 106 and requests (e.g., via one or more service requests) re-establishment of PDU sessions to obtain IP services. As is generally known, registration involves, for example, exchange of control messages (e.g., Non-access stratum (NAS) messages or Point-to-Point over Ethernet (PPPoE) control plain messages) according to one or more established Packet Forwarding Control Protocol (PFCP) sessions (forwarding rules). Moreover, because service requests and PDU session establishment methods such as this are generally known, a detailed discussion is omitted. Once re-registration is complete, the 5GC 106 assigns a new IPv6 prefix to the 5G-RG 102.

At S26, upon or in response to being assigned a new IPv6 prefix, the 5G-RG 102 performs prefix deprecation for existing IPv6 address leases with a now invalid IPv6 prefix as a result of (e.g., in response to) the assigning of the new IPv6 prefix at S24. The 5G-RG 102 may perform prefix deprecation for all IP addresses assigned based on the IP prefix determined to be no longer valid.

According to at least one example embodiment, if the end user device 112 in FIG. 1 is assigned a IPv6 Stateless Address Auto-Configuration (SLAAC) only address, then the 5G-RG 102 may advertise to the end user device 112 that the current IPv6 SLAAC address has a valid lifetime of 0. In response to this advertisement and valid lifetime of 0, the end user device 112 is prompted to obtain a new SLAAC prefix from the 5G-RG 102. The end user device 112 may obtain the new SLAAC prefix from the 5G-RG 102 in any known manner.

In another example, if the 5G-RG 102 and the end user device 112 support DHCPv6, then the 5G-RG 102 may perform the prefix deprecation at S26 by, for example, (i) redirecting one or more HTTP requests from the end user device 112 to a local portal page that informs the end user that release and renewal of the current IPv6 address for the end user device 112 is required, (ii) sending a prefix renewal information message to the end user device 112 and/or (iii) by shutting down and/or disabling access (e.g., wireless access) to the 5G-RG 102 by the end user device 112 for a threshold time interval. In one example, the threshold time interval may be about 30 seconds, or more generally, between about 15 seconds and about 60 seconds.

In at least one example embodiment, the sending of the prefix renewal information message may include informing the end user through App, mobile SMS or other text message, email, or the like, that the end user device 112 and all end user devices require reboot and/or release and renewal of their current IPv6 address.

The 5G-RG 102 may shut down access to the 5G-RG 102 by the end user device 112 for the threshold time interval by performing auto shutdown of the WiFi Service Set Identifier (SSID) associated with the wireless connection between the end user device 112 and the 5G-RG 102 for the threshold time interval. Once the threshold time interval has expired, the end user device 112 determines that a new IPv6 address is required and obtains the new IPv6 address from the 5G-RG 102.

Figure 3:
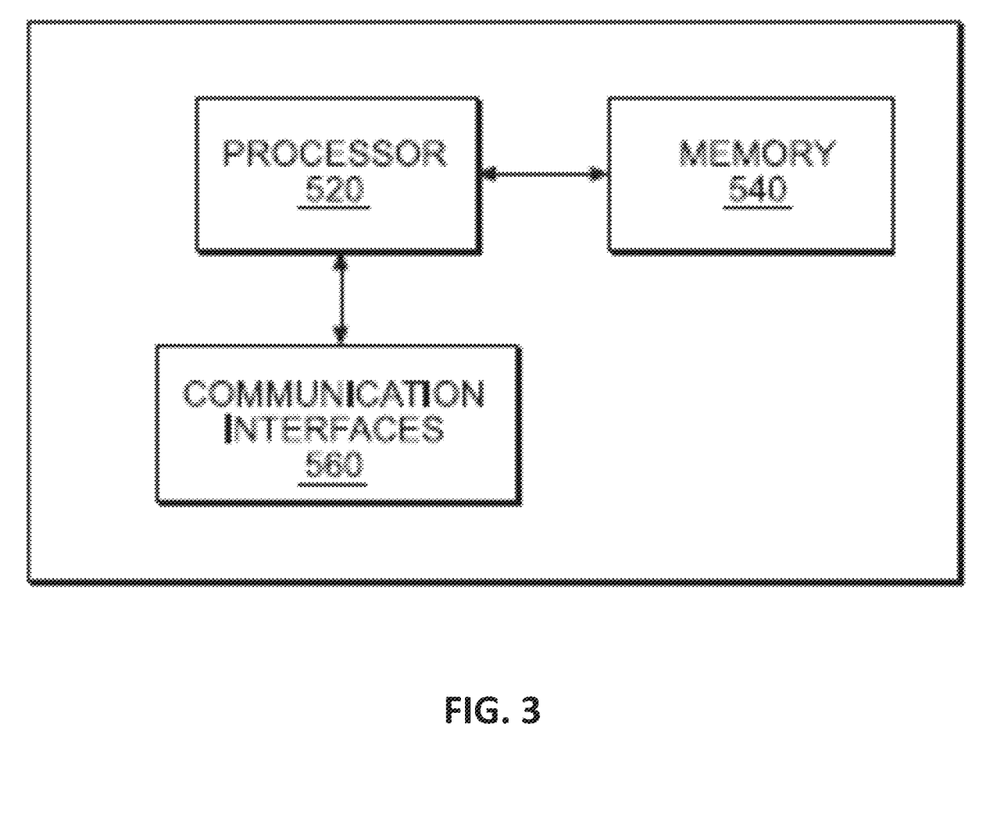
FIG. 3 illustrates a residential gateway according to example embodiments.

FIG. 3 illustrates a RG according to example embodiments. The structure shown in FIG. 3 may also be representative of other network elements, such as CPEs, etc. The RG may be a 5G-RG, such as the 5G-RG 102 in FIG. 1.

As shown, the RG includes: a memory 540; a processor 520 connected to the memory 540; various communication interfaces 560 connected to the processor 520. The various interfaces 560 may constitute a transceiver for transmitting/receiving data from/to other network elements (e.g., network nodes, routers, nodes, servers, CPEs, etc.). As will be appreciated, depending on the implementation of the RG, the RG may include many more components than those shown in FIG. 3. However, it is not necessary that all of these generally conventional components be shown in order to disclose the illustrative example embodiment. For example purposes, the example embodiment shown in FIG. 3 will be discussed with regard to a processor 520. However, it should be understood that the RG shown in FIG. 3 may include one or more processors or other processing circuitry, such as one or more Application Specific Integrated Circuits (ASICs), Field Programmable Gate Arrays (FPGAs), etc.

The memory 540 may be a computer-readable storage medium that generally includes a random access memory (RAM), read only memory (ROM), and/or a permanent mass storage device, such as a disk drive. The memory 540 also stores an operating system and any other routines/modules/applications for providing the functionalities of the RG, or other network element, to be executed by the processor 520. These software components may also be loaded from a separate computer-readable storage medium into the memory 540 using a drive mechanism (not shown). Such separate computer-readable storage medium may include a disc, tape, DVD/CD-ROM drive, memory card, or other like computer-readable storage medium (not shown). In some example embodiments, software components may be loaded into the memory 540 via one of the various interfaces 560, rather than via a computer-readable storage medium.

The processor 520 or other processing circuitry may be configured to carry out instructions of a computer program by performing the arithmetical, logical, and input/output operations of the system. Instructions may be provided to the processor 520 by the memory 540.

The various communication interfaces 560 may be wired and may include components that interface the processor 520 with the other input/output components. As will be understood, the various interfaces 560 and programs stored in the memory 540 to set forth the special purpose functionalities of the RG will vary depending on the implementation of the RG.

The interfaces 560 may also include one or more user input devices (e.g., a keyboard, a keypad, a mouse, or the like) and user output devices (e.g., a display, a speaker, or the like).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network nodes, RGs, servers, ANs, CPEs, routers, or other network elements and/or hardware. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer-readable storage medium" or "non-transitory computer-readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer-readable medium such as a computer-readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, network nodes, RGs, servers, ANs, CPEs, routers, or other network elements, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

The term "non-transitory," as used herein, is a limitation of the medium itself (e.g., tangible, not a signal) as opposed to a limitation on data storage persistency (e.g., RAM vs. ROM).

As described herein, the term "circuitry" may refer to one or more or all of the following: (a) hardware-only circuit implementations (such as implementations in only analog and/or digital circuitry) and (b) combinations of hardware circuits and software. Combinations of hardware circuits and software may include, for example: (i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions); and (iii) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A method for facilitating network access to a network, via a residential gateway, the method comprising:
   communicating, by the residential gateway, packet data for IP services being provided to an end user device and the network, the end user device having been assigned an IP address based on a first IP prefix assigned to the residential gateway;
   receiving, at the residential gateway, a request to re-register the residential gateway from the network;
   re-registering the residential gateway with the network;
   receiving, at the residential gateway, a second IP prefix assigned to the residential gateway after the re-registering of the residential gateway with the network, the second IP prefix being a replacement IP prefix for the first IP prefix; and
   notifying, by the residential gateway, the end user device that the IP address assigned to the end user device is no longer valid based on receipt of the second IP prefix.

2. The method of claim 1, wherein the notifying comprises:
   informing the end user device that the IP address must be renewed for continued access to the IP services via the residential gateway.

3. The method of claim 2, further comprising:
   renewing the IP address by assigning an IP address from the second IP prefix to the end user device without hard reboot of the residential gateway.

4. The method of claim 2, wherein the informing includes at least one of:
- performing a portal HTTP redirect to inform the end user device that the IP address must be renewed;
- disabling a wireless network connection between the end user device and the residential gateway;
- informing the end user device that an address lifetime for the IP address is 0; or
- pushing a notification to the end user device, the notification informing the end user device that the IP address must be renewed.

5. The method of claim 4, wherein
the informing includes disabling the wireless network connection; and
the disabling the wireless network connection includes performing a shutdown of a service set identifier associated with the wireless network connection between the end user device and the residential gateway.

6. The method of claim 2, wherein
the residential gateway is configured for SLAAC based IP address assignment; and
the informing includes informing the end user device that an address lifetime for the IP address is 0.

7. The method of claim 1, wherein the residential gateway is a 5G residential gateway, the network is a 5G core, and the IP address is an IPV6 address.

8. The method of claim 1, wherein the second IP prefix replaces the first IP prefix at the residential gateway.

9. A residential gateway to facilitate network access to a network, the residential gateway comprising:
- at least one processor; and
- at least one memory storing instructions that, when executed by the at least one processor, cause the residential gateway to
  - communicate packet data for IP services being provided to an end user device and the network, the end user device having been assigned an IP address based on a first IP prefix assigned to the residential gateway,
  - receive a request to re-register the residential gateway from the network,
  - re-register the residential gateway with the network,
  - receive a second IP prefix assigned to the residential gateway after re-registering the residential gateway with the network, the second IP prefix being a replacement IP prefix for the first IP prefix, and
  - notify the end user device that the IP address assigned to the end user device is no longer valid based on receipt of the second IP prefix.

10. The residential gateway of claim 9, wherein the instructions, when executed by the at least one processor, cause the residential gateway to notify the end user device by informing the end user device that the IP address must be renewed for continued access to the IP services via the residential gateway.

11. The residential gateway of claim 10, wherein the instructions, when executed by the at least one processor, cause the residential gateway to renew the IP address by assigning an IP address from the second IP prefix to the end user device without hard reboot of the residential gateway.

12. The residential gateway of claim 10, wherein the instructions, when executed by the at least one processor, cause the residential gateway to inform the end user device by at least one of
- performing a portal HTTP redirect to inform the end user device that the IP address must be renewed,
- disabling a wireless network connection between the end user device and the residential gateway,
- informing the end user device that an address lifetime for the IP address is 0, or
- push a notification to the end user device, the notification informing the end user device that the IP address must be renewed.

13. The residential gateway of claim 12, wherein
the instructions, when executed by the at least one processor, cause the residential gateway to inform the end user device by disabling the wireless network connection, and
the disabling the wireless network connection includes performing a shutdown of a service set identifier associated with the wireless network connection between the end user device and the residential gateway.

14. The residential gateway of claim 10, wherein
the residential gateway is configured for SLAAC based IP address assignment; and
the instructions, when executed by the at least one processor, cause the residential gateway to inform the end user device that the IP address must be renewed by informing the end user device that an address lifetime for the IP address is 0.

15. The residential gateway of claim 9, wherein the residential gateway is a 5G residential gateway, the network is a 5G core, and the IP address is an IPV6 address.

16. The residential gateway of claim 9, wherein the second IP prefix replaces the first IP prefix at the residential gateway.

17. A non-transitory computer-readable storage medium storing computer executable instructions that, when executed by at least one processor at a residential gateway, cause the residential gateway to perform a method for facilitating network access to a network, via the residential gateway, the method comprising:
- communicating, by the residential gateway, packet data for IP services being provided to an end user device and the network, the end user device having been assigned an IP address based on a first IP prefix assigned to the residential gateway;
- receiving, at the residential gateway, a request to re-register the residential gateway from the network;
- re-registering the residential gateway with the network;
- receiving, at the residential gateway, a second IP prefix assigned to the residential gateway after the re-registering of the residential gateway with the network, the second IP prefix being a replacement IP prefix for the first IP prefix; and
- notifying, by the residential gateway, the end user device that the IP address assigned to the end user device is no longer valid based on receipt of the second IP prefix.

18. The non-transitory computer-readable storage medium of claim 17, wherein the notifying comprises:
informing the end user device that the IP address must be renewed for continued access to the IP services via the residential gateway.

19. The non-transitory computer-readable storage medium of claim 18, wherein the informing includes at least one of:
- performing a portal HTTP redirect to inform the end user device that the IP address must be renewed;
- disabling a wireless network connection between the end user device and the residential gateway;
- informing the end user device that an address lifetime for the IP address is 0; or push a notification to the end user device, the notification informing the end user device that the IP address must be renewed.

20. The non-transitory computer-readable storage medium of claim 17, wherein the method further comprises: renewing the IP address by assigning an IP address from the second IP prefix to the end user device without hard reboot of the residential gateway.

\* \* \* \* \*